ns. Patented Sept. 9, 1958

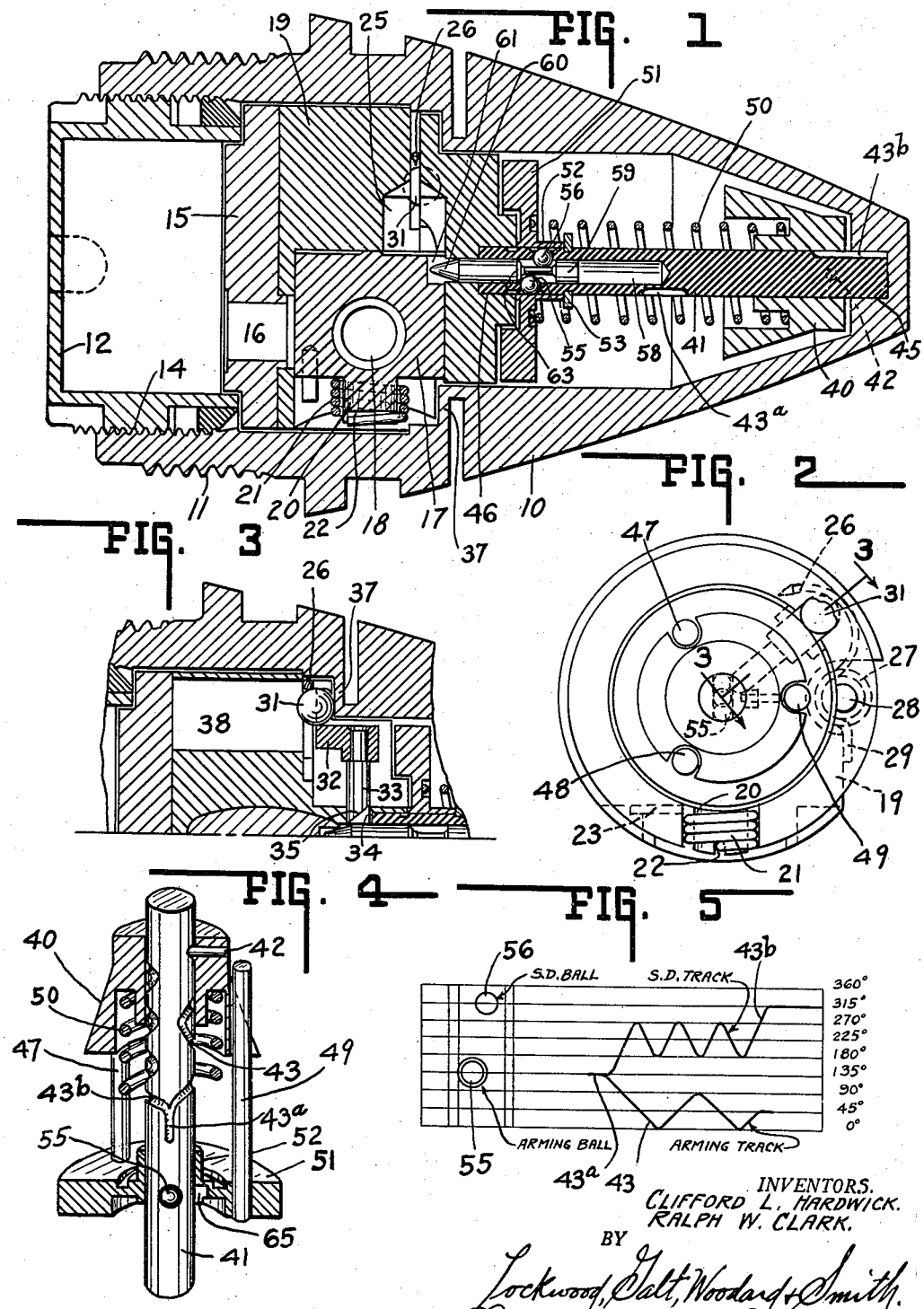

2,850,979
TIME DELAY CONTROL MEANS

Clifford L. Hardwick and Ralph W. Clark, Fort Wayne, Ind., assignors to The Magnavox Company, Fort Wayne, Ind., a corporation Application April 19, 1954, Serial No. 424,686

5 Claims. (Cl. 102—71)

This device relates generally to arming and self-destruction devices for explosive rockets, and more particularly it relates to timing devices for arming rockets and operating a firing mechanism whenever the rocket propellant burns out and the rocket has missed its target.

Conventional rockets, and more particularly conventional explosive rockets for aerial warfare, include as a part of the firing mechanism a timing device, the operation of which is initiated automatically when the propelling charge is ignited. The reason for arming a rocket after it has been launched is to prevent firing of the explosive charge before the rocket is actually launched. Thus, during handling, transportation and storage, the war head of the rocket can not be initiated by the firing mechanism to cause accidental explosion thereof.

Prior practice has been to provide a clock mechanism, the operation of which is initiated when the rocket is launched, whereby the clock mechanism operates to arm the rocket after it has been launched and after it has proceeded a predetermined distance from the launching site. Clock mechanisms are expensive to manufacture and are relatively delicate. Because of their delicacy, rough handling can damage the timing mechanism, resulting in failure of the mechanism to arm the rocket after it has been launched.

Rockets may be used in aerial warfare over friendly territory and, consequently, if the rocket misses its target, it may drop into such friendly territory, destroying equipment and personnel of friendly armed forces. Therefore, it is necessary that some self-destroying mechanism be provided whereby if a rocket misses its target, it will be exploded and destroyed before it can drop on friendly territory. Of course, it is also desirable to destroy a rocket under such circumstances in order to prevent its being found by enemy forces, thereby preventing the enemy from learning its structure and mechanism.

The principal object of this invention is to provide a simple timing mechanism adapted to arm a rocket within a predetermined distance from its launching site and to destroy the rocket within a predetermined distance beyond the end of its accelerative trajectory, or beyond its intended target.

Another object of this invention is to provide an arming and self-destruction timing mechanism responsive to acceleration and deceleration, respectively, of the rocket.

Still another object of the invention is to provide a timing mechanism responsive to acceleration of a rocket for arming the firing mechanism thereof, and responsive to deceleration of a rocket for operating the firing mechanism of the rocket, thereby to destroy the rocket within a predetermined distance after acceleration stops.

In accordance with this invention there is provided in a rocket having a firing mechanism and a shutter for arming said firing mechanism, means movable for releasing said shutter mechanism and also movable for releasing said firing mechanism, a movable mass responsive to acceleration for moving said release means into its shutter releasing position in response to acceleration of the rocket and movable in response to deceleration of the rocket for permitting movement of said release means into a position for operating said firing mechanism.

The full nature of the invention will be understood from the accompanying drawings and the following description and claims:

Fig. 1 is a longitudinal cross section of a typical nose structure of a rocket and the timing mechanism provided in accordance with this invention.

Fig. 2 is a side elevation of Fig. 1 taken from the right hand side thereof and omitting the external casing.

Fig. 3 is a partial cross sectional view taken on line 3—3 of Fig. 2.

Fig. 4 is a fragmentary partial cross section of the timing mechanism illustrated in Fig. 1.

Fig. 5 is a diagram illustrating a development of the surface of shaft 41 illustrated in Figs. 1 and 4.

The rocket nose illustrated in Fig. 1 comprises a casing 10 threaded at 11 for attachment to the main casing of the rocket. Within the tail end of the outer casing 10 there is provided a cup member 12 threaded at 14 within casing 10. Cup member 12 may contain an explosive charge which may be the main explosive charge or a detonating charge adapted to initiate explosion of a main charge disposed within the main casing of the rocket.

Forward of the cup 12 there is provided a wall member 15 having an aperture 16 adapted to conduct the flash from a detonator, thereby to set off the charge within cup 12. Normally the aperture 16 is closed by means of a cylindrical shutter 17 having a passage 18 which can be rotated into alignment with the aperture 16 for passing a detonating flash from a detonator into passage 16.

The shutter 17 may be mounted within the cylindrical chamber in a block 19 and is provided with a projecting stud 20 on which is coiled a driving spring 21. Spring 21 is assembled in tightly wound condition with one end thereof lying in slot 22 of stud 20 and the other end 23 thereof projecting into a bore (not shown) in block 19. The release mechanism to be described subsequently may be operated whereby spring 21 serves to rotate shutter 17 through a ninety degree angle where passage 18 will be in alignment with aperture 16.

Block 19 is formed to provide a chamber 25 within which may be provided a primer. For firing the primer there is provided a firing pin 26 which comprises a coiled spring member 27 coiled around a post 28 with the end 29 bearing on the surface of block 19, as illustrated in Fig. 2. The firing pin 26 is held in cocked position by means of a ball 31 positioned in contact with a portion of casing 10, slightly off center with respect to pin 26 as shown in Fig. 3, and resting on a shelf member 32. Shelf member 32 is in turn supported on a shaft 33 which projects into a bore 34 in block 19 and has a bevel 35 at the end thereof, the purpose of which will become apparent from subsequent description. The ball 31 normally holds firing pin 26 in position illustrated in Figs. 1, 2 and 3 and may be displaced in response to impact of the nose 10 with a target due to flexure of the portion 37 of nose 10. Ball 31 can move over into the chamber 38 in block 19, thereby to release firing pin 26.

The structure described so far is not the invention of applicants. This invention resides in the provision of an acceleration and deceleration responsive mechanism for controlling the rotation of the shutter 17 for arming the rocket, and also for controlling the motion of the shelf, pin assembly 32, 33 to release firing pin 26 and explode the rocket at a predetermined time after its propellant charge has burned out and deceleration has started.

The timing and control mechanism comprises a weight or mass 10 slidably mounted on shaft 41 and having a pin 42 extending into a zigzag track 43 in shaft 41. The shaft 41 is fixedly and non-rotatably mounted at one end in the bore 46 formed in the block 19. The mass or weight 40 is adapted to slide on shaft 41 and also to rotate on shaft 41 by means of the driving action of pin 42. Weight 40 is arranged to rotate a disc 51 by means of rods 47, 48 and 49 supported therein, weight 40 being notched to receive the rods as illustrated in Fig. 2. Weight 40 is normally held in the position illustrated in Fig. 1 by means of a coil spring 50 which bears at one end on weight 40 and at the other end on the disc 51, freely mounted on shaft 41.

Disc 51 includes a hub member 52, the outer end of which engages a snap ring 53 mounted in a slot on shaft 41, whereby disc 51 is held in relatively fixed position axially of shaft 41. A pair of balls 55 and 56 are mounted within suitable holes drilled in shaft 41 and normally held in a position where their exterior surface is flush with the exterior surface of shaft 41. Within the bore 58 of shaft 41 there is slideably mounted a trigger pin 59 having a conical end portion 60 projecting into a slot 61 in shutter 17, thereby to prevent the shutter 17 from being rotated by spring 21. The trigger pin 59 is turned down to a reduced diameter to form a shoulder 63 whereby ball 55 in its normal position serves to prevent trigger pin 59 from moving to the right. In this manner the shutter 17 is held in the disarming position. Similarly, pin 59 serves to hold the shelf and pin assembly 32, 33 in its upward position, holding the ball 31 in position to prevent action of firing pin 26.

The disc 51 is provided with a hole or recess 65 adapted to receive the ball 55 after the rocket has progressed a given distance from its launching site. The disc normally holds ball 55 in the position shown in Fig. 1, but acceleration of the rocket after it is launched causes weight 40 to move along shaft 41, whereby pin 42 riding in track 43 eventually enters the terminal portion 43a of the track, rotating disc 51 through a net angle of 90° and aligning the hole 65 in disc 51 with ball 55. When the ball 55 enters hole 65, a camming action of the wall of recess 61 on conical end 60 of pin 59 moves pin 59 to the right until shoulder 63 engages ball 56, thus releasing the shutter 17 and permitting it to rotate into such a position that passage 18 is in alignment with aperture 16.

Disc 51 may also be rotated to align hole 65 with ball 56 for releasing the pin 59 for further movement to the right. This alignment occurs when disc 51 is rotated in response to deceleration of the rocket after the propelling charge has burned out. For rotating disc 51 in this manner, there is provided a continuation 43b of track 43, whereby weight 40 returns to its initial axial position under the influence of decelerative forces with pin 42 tracking in the track 43b. At the end of the outward excursion of weight 40, disc 51 will have been rotated through another 180 degrees, thereby to align hole 65 in disc 51 with ball 56. Ball 56 can then move outwardly due to the fact that the bevelled surface 35 on pin 33 will be in engagement with the conical end 60 on pin 59 exerting a cam action on pin 59, as a result of which the shoulder 63 on pin 59 will likewise cam the ball outwardly through hole 65. The various cam actions are initiated by the force exerted by firing pin 26 acting downwardly through ball 31 and shelf 32 to shaft 33. As a result of the further motion of pin 59, the shelf and pin assembly 32, 33 is permitted to move downwardly to such an extent that ball 31 moves downwardly and to the right over shelf 32 and out of the way of firing pin 26, whereby pin 26 is released to detonate the explosive charge.

It is to be noted that the various parts of track 43, with the exception of terminal portion 43a, have a zigzag path which creates sufficient friction on pin 42 to provide a time delay between initiation of rotation of shaft 41 and termination of such rotation. This time delay depends upon the rate of acceleration or deceleration and is in proportion thereto. Consequently, the rocket will always have reached the predetermined point in its trajectory before arming or self-destruction occurs, regardless of the rate of acceleration or deceleration, respectively. This is an important safety factor which prevents detonation of the rocket too soon after its release or too late after it has missed its target.

In operation, the timing mechanism in accordance with this invention is initially assembled with the parts positioned as illustrated in Figs. 1, 2 and 3. When the rocket is launched, it accelerates at a high rate, whereby the inertia of weight 40 causes it to move along shaft 41. The weight is oscillated and in turn oscillates disc 51 by means of the rods 47, 48 and 49. Pin 42 engaging track 43 initially causes oscillation of disc 51, shaft 41 being nonrotatable. Weight 40 progresses at a rate determined by the rate of acceleration and the friction on pin 42 until pin 41 enters the terminal position 43a of track 43 and disc 51 is rotated through 90° to align hole 65 with ball 55. Thus, there is a predetermined delay period between launching and arming.

Ball 55 is released out of the way of shoulder 63 on pin 59, whereby the action of spring 21 on shutter 17 causes a camming action between the wall of recess 61 and the end 60 of pin 59, moving pin 59 to the right until shoulder 63 engages ball 56. Pin 59 will have moved far enough to disengage shutter 17, permitting it to rotate and align passage 18 with aperture 16. This arms the rocket so that upon impact with the target, ball 31 is released, freeing firing pin 26 and detonating the explosive charge.

If the rocket misses the target, it proceeds along its trajectory until the propelling charge is burned out, at which point the rocket commences to decelerate. The effect of decelerative forces plus the action of spring 50 causes the weight 40 to move forward in the nose 10, whereby the pin 42 in weight 40 tracks the portion 43b of track 43, oscillating disc 51. Again the action of the zigzag portion 43b acts in response to the forces acting on weight 40 to delay the movement of weight 40 until the rocket has proceeded a predetermined distance after its propelling charge has burned out. At the end of the forward excursion of weight 40, disc 51 will have been rotated another 180 degrees to align hole 65 in disc 51 with ball 56, permitting it to move out of the way of shoulder 63 on pin 59. The camming action of bevel 35 on pin 33 moves pin 59 forward in bore 58 to such a point that shelf 32 on pin 33 moves downwardly far enough to permit ball 31 to move to the right releasing firing pin 26. Firing pin 26 detonates the explosive charge, destroying the rocket a predetermined distance along its decelerating trajectory.

From the foregoing description it will be apparent that this invention provides a timing mechanism for arming and/or destroying rockets which is simple to manufacture and assemble and which is rugged and not subject to injury from transportation and storage or handling. Furthermore, the timing action of pin 42 traveling in track 43 is directly proportional to the rate of acceleration or deceleration of the rocket, whereby the arming or self-destruction action can occur only at predetermined points in the trajectory of the rocket.

The invention claimed is:

1. A timing control mechanism for a rocket or other missile having a shutter device for arming purposes and a firing pin for initiating detonation, comprising a fixed shaft disposed within the casing of said rocket or missile, axially thereof, a zigzag track on said shaft having an arming time control portion and a self-destroying time control portion disposed on opposite sides of said shaft and a common terminal portion connecting said timing portions at one end thereof, a weight slideably mounted on said shaft with a pin projecting out of said weight and normally into said track at the open end of the arming control portion, a trigger pin mounted in said shaft in operative relation to said shutter device and said firing pin and formed to provide a section of reduced diameter, said shaft having an axial bore for accommodating said trigger pin and longitudinally spaced apertures in a common plane opposite the normal position of said reduced diameter section, a ball disposed in each aperture and resting in said reduced diameter section to lock said trigger pin, one aperture being disposed to align with the common terminal portion of said track, and the other aperture being disposed to align with the open end of the self-destroying control portion of said track, whereby motion of said weight in response to acceleration rotates said ball retaining member into position to release one ball and said trigger pin with respect to said shutter and motion of said weight in response to deceleration releases the other ball and said trigger pin with respect to said firing pin.

2. A timing control mechanism, for a rocket or other missile having a shutter device for arming purposes and a firing pin for initiating detonation, comprising a fixed shaft disposed within the casing of said rocket or missile, axially thereof, a zigzag track on said shaft having an arming time control portion and a self-destroying time control portion disposed on opposite sides of said shaft and a common terminal portion connecting said timing portions at one end thereof, a weight slideably mounted on said shaft with a pin projecting out of said weight and normally into said track at the open end of the arming control portion, a trigger pin mounted in said shaft in operative relation to said shutter device and said firing pin and formed to provide a section of reduced diameter, said shaft having an axial bore for accommodating said trigger pin and longitudinally spaced apertures in a common plane opposite the normal position of said reduced diameter section, a stop member disposed in each aperture and resting in said reduced diameter section to lock said trigger pin, a retaining member connected to said weight and rotatably mounted on said shaft to close said apertures when said weight is in its normal position, one aperture being disposed to align with the common terminal portion of said track, and the other aperture being disposed to align with the open end of the self-destroying control portion of said track, said retaining member including a stop member release hole whereby motion of said weight in response to acceleration rotates said retaining member into position to release one stop member and said trigger pin with respect to said shutter, and motion of said weight in response to deceleration releases the other stop member and said trigger pin with respect to said firing pin.

3. A timing control mechanism, for a rocket or other missile having a shutter device for arming purposes and a firing pin for initiating detonation, comprising a shaft disposed within the casing of said rocket or missile, axially thereof, a zigzag track on said shaft having an arming time control portion and a self-destroying time control portion disposed on opposite sides of said shaft and a common terminal portion connecting said timing portions at one end thereof, a weight slideably mounted on said shaft with a pin projecting out of said weight and normally into said track at the open end of the arming control portion, a trigger pin mounted in said shaft in operative relation to said shutter device and said firing pin and formed to provide spaced shoulders thereon, said shaft having an axial bore for accommodating said trigger pin, stop members disposed in said shaft and resting in the way of said shoulders to lock said trigger pin, a stop retaining member disposed on said shaft in the way of said stop members when said weight is in its normal position and connected to rotate with said weight, whereby motion of said weight in response to acceleration rotates said retaining member out of the way of one stop member to release said trigger pin with respect to said shutter and motion of said weight in response to deceleration rotates said retaining member out of the way of the other stop member to release said trigger pin with respect to said firing pin.

4. A timing control mechanism, for a rocket or other missile having a shutter device for arming purposes and a firing pin for initiating detonation, comprising a shaft disposed within the casing of said rocket or missile, axially thereof, a zigzag track on said shaft having an arming time control portion and a self-destroying time control portion disposed on opposite sides of said shaft and a common terminal portion connecting said timing portions at one end thereof, a weight slideably mounted on said shaft with a pin projecting out of said weight and normally into said track at the open end of the arming control portion, a trigger pin mounted in said shaft and normally positioned in locking relation to said shutter device and said firing pin, said shaft having an axial bore for accommodating said trigger pin, stop means for locking said trigger pin in said normal position and in a second position in locking relation to said firing pin, and a retaining member connected to said weight and disposed to lock said stop means when said weight is in its normal position, motion of said weight in response to acceleration being effective to move said retaining member into position to release said stop means and said trigger pin with respect to said shutter and motion of said weight in response to deceleration being effective to release the said stop means and said trigger pin with respect to said firing pin.

5. A timing control mechanism, for a rocket or other missile having a shutter device for arming purposes and a firing pin for initiating detonation, comprising a shaft disposed within the casing of said rocket or missile, axially thereof, a zigzag track on said shaft having an arming time control portion and a self-destroying time control portion disposed on opposite sides of said shaft and a common terminal portion connecting said timing portions at one end thereof, a weight slideably mounted on said shaft with a pin projecting out of said weight and normally into said track at the open end of the arming control portion, whereby motion of said weight along said shaft causes oscillation of said weight, a trigger normally connected to said shutter device and to said firing pin to disarm said missile, first trigger release means operable when said pin enters the common terminal portion of said track, second trigger release means operable when said pin enters the open end of the self-destroying control portion of said track, and means connected to said weight and to said trigger release means whereby motion of said weight in response to acceleration actuates said first trigger means with respect to said shutter and motion of said weight in response to deceleration actuates said second trigger means with respect to said firing pin.

References Cited in the file of this patent
UNITED STATES PATENTS

| | | |
|---|---|---|
| 2,164,115 | Lasserre | June 27, 1939 |
| 2,243,621 | Denoix | May 27, 1941 |
| 2,595,757 | Brandt | May 6, 1952 |
| 2,666,390 | Brandt | Jan. 19, 1954 |